Oct. 29, 1946.  W. H. BASELT ET AL  2,410,195
ROTOR AND METHOD OF MAKING
Filed July 8, 1942  4 Sheets-Sheet 3
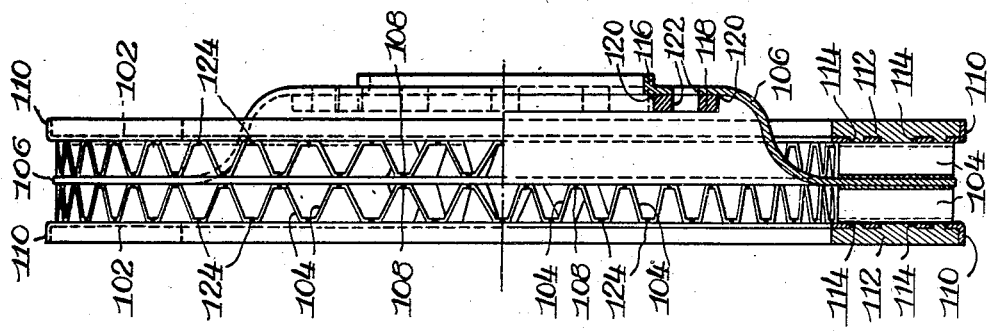
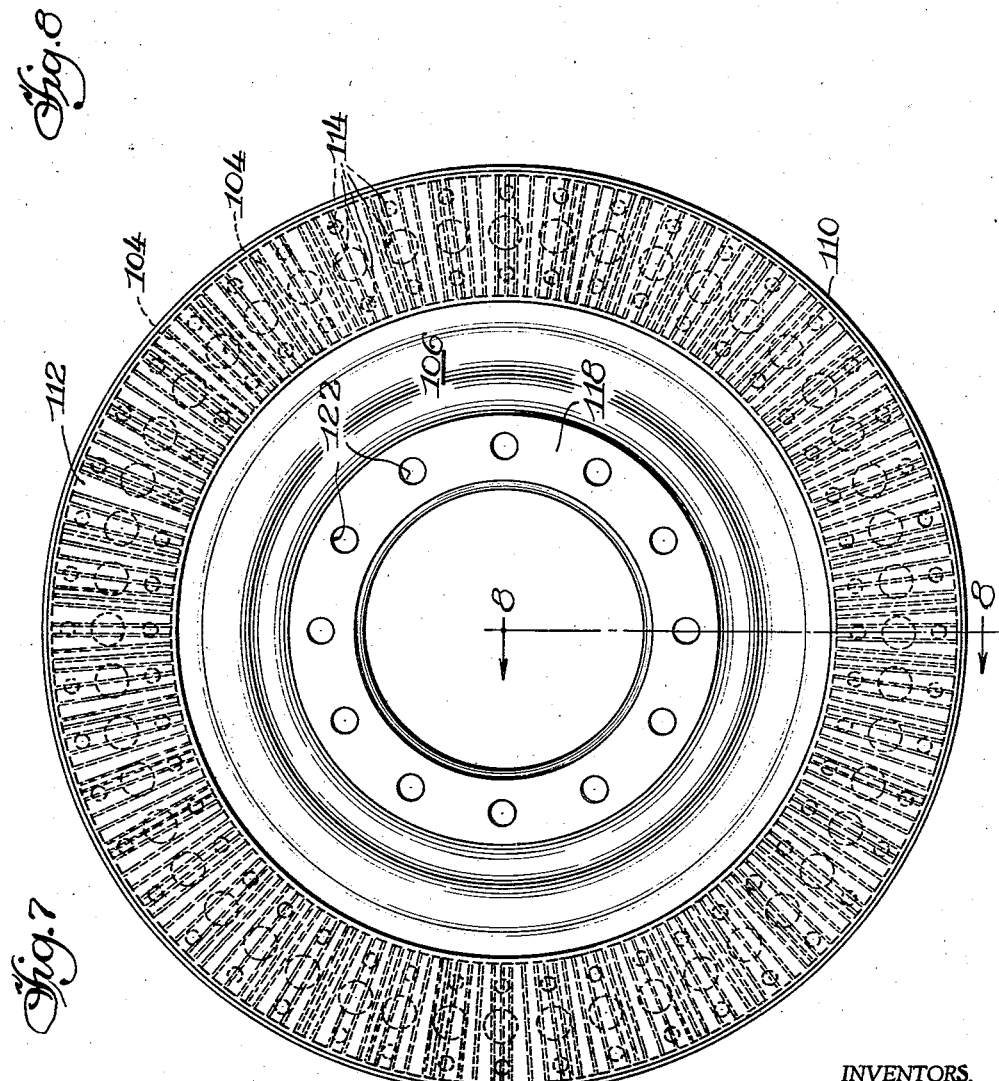
INVENTORS.
Walter H. Baselt
and Carl E. Jack
BY
Atty.

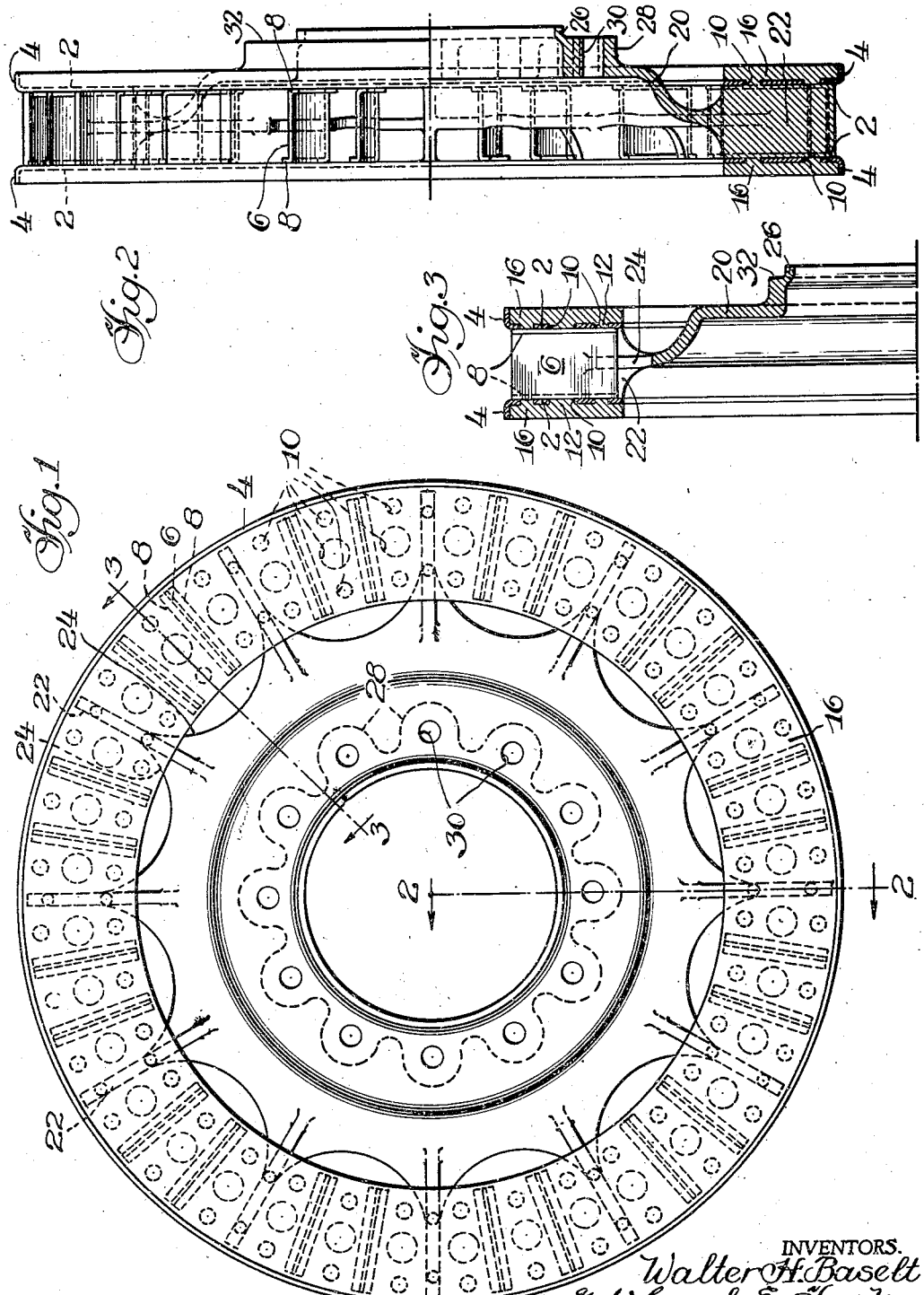

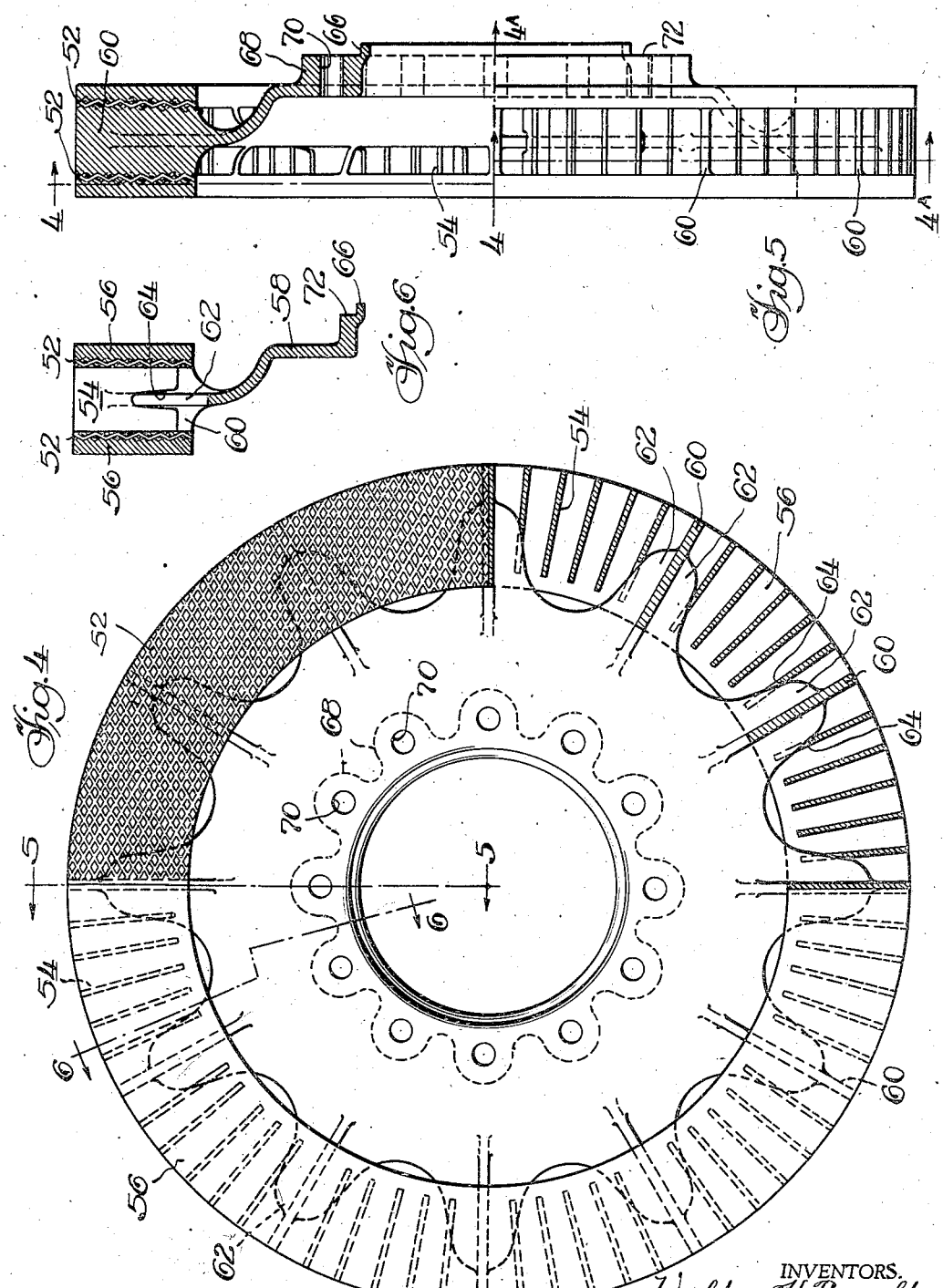

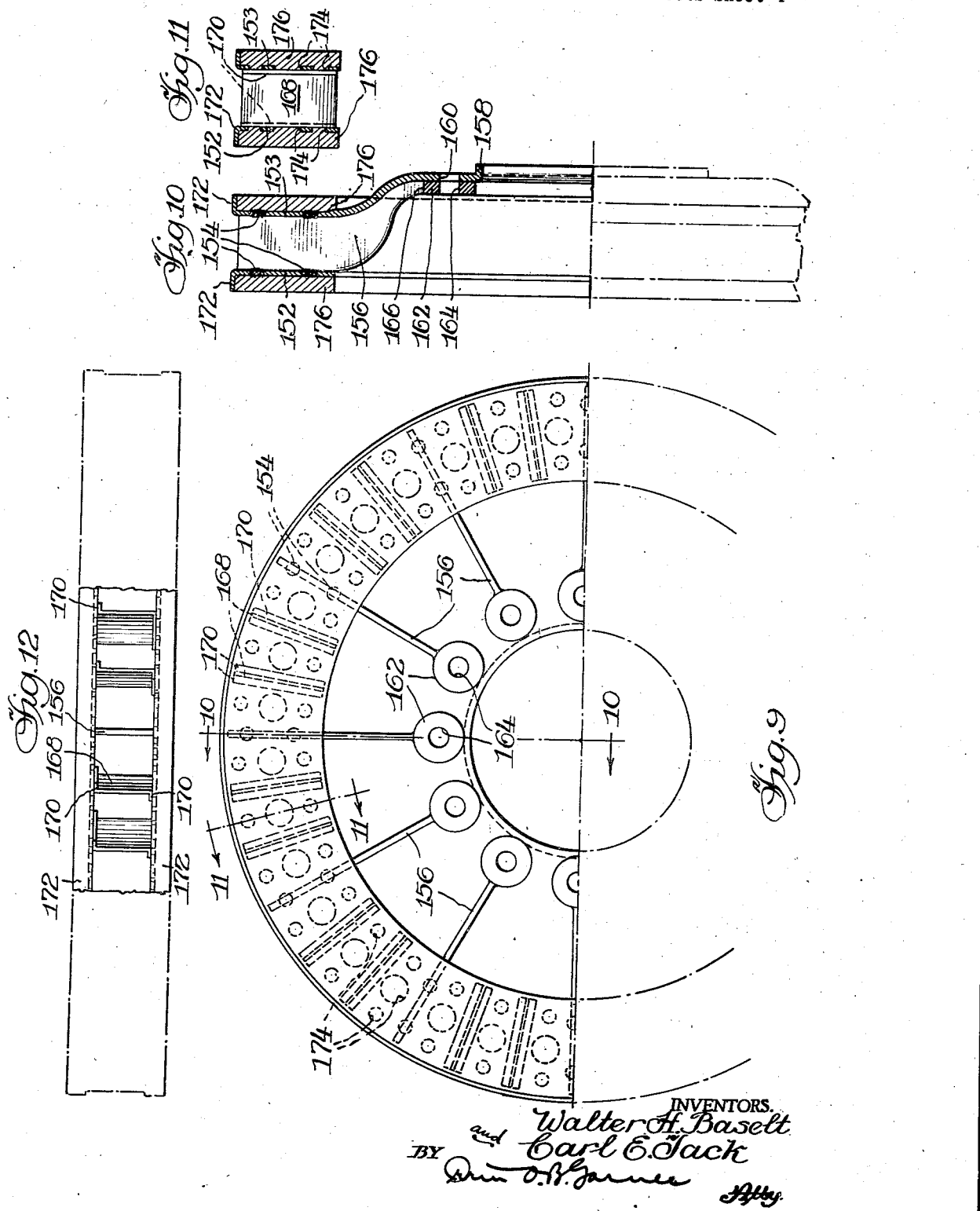

Patented Oct. 29, 1946

2,410,195

UNITED STATES PATENT OFFICE 2,410,195

ROTOR AND METHOD OF MAKING

Walter H. Baselt, Tucson, Ariz., and Carl E. Tack, Chicago, Ill., assignors to American Steel Foundries, Chicago, Ill., a corporation of New Jersey Application July 8, 1942, Serial No. 450,136

19 Claims. (Cl. 188—218)

Our invention relates to brake equipment and particularly to a novel form of rotor designed to be associated with other braking means commonly called stators whose engagement with said rotor is commonly utilized as a means of stopping a wheel or other rotating member.

Our novel rotor is particularly adapted for use with railway rolling stock and is so illustrated, although it will be understood that such a rotor may be utilized for any equivalent purpose for which it may be readily adapted.

In the present development of off-wheel brakes for railway rolling stock, it has been found necessary to develop a particularly rigid rotor capable of dissipating a tremendous amount of heat energy in order to afford stopping means for present day high speed trains.

The general object of our invention is to devise a rotor which will be eminently satisfactory for such a purpose and wherein the required strength as well as the heat dissipating qualities will be afforded and which at the same time will readily meet practical requirements of manufacture as well as necessary operating conditions.

An object of our invention is to devise such a rotor comprising a disc-like support which may be readily fastened to the hub of a wheel or other rotating member and may serve as carrying means for a brake ring, said brake ring defining in certain of the disclosed modifications a double blower in which air is drawn between the brake surfaces thereof from opposite sides of the disc-like support member and said brake ring in another modification defining a single blower rotor in which air is drawn between the friction surfaces from only one side of the disc-like support member.

A specific object of our invention is to design a fabricated rotor of the above described type in which spaced annular backing members afford support for iron brake rings cast on the outer surfaces thereof, said backing members also affording support for radial blades welded therebetween. In certain of the modifications disclosed the backing members are annular plates flanged respectively at the outer perimeters thereof and in another modification the backing members are annular pieces of metallic mesh.

In certain of the modifications disclosed the support or hub member for the rotor is disposed intermediate the braking members, thus forming a double blower rotor as above described and in one modification the support or hub member is formed as an integral part of one of the backing plates, said plates affording support for annular iron brake rings cast thereon as above described.

Our invention comprehends a double blower rotor formed and arranged as described in the co-pending application Serial No. 409,999, filed September 8, 1941, in the name of Carl E. Tack and which has issued as Patent No. 2,350,970, dated June 6, 1944.

Another object of our invention is to devise a fabricated double blower rotor as above described in which the hub member or support disc is cast integral with the iron brake rings and comprises radial ribs extending between the backing members at spaced points, said ribs extending through openings in the backing members to merge with the brake rings and each of said ribs being reinforced by webs on the hub member merging at right angles with said rib.

Another object of our invention is to devise a fabricated double blower rotor of the above described type in which the hub member or support disc is welded between radial blades which are in turn welded to the respective backing members, said members affording support for the iron brake rings cast on the outer surfaces thereof as previously described.

Still another object of our invention is to devise a single blower rotor in which spaced backing plates afford a support for iron brake rings cast thereon, said plates also affording a support for radial blades welded therebetween, one of the backing plates being formed as a hub member and having an annular reinforcing ring welded thereto at its point of securement to an associated wheel or other rotating member.

A further object of our invention is to devise a novel method of manufacturing a rotor such as above described.

In the drawings, Figure 1 is a side elevation of a fabricated double blower rotor embodying our invention. Figure 2 is an edge elevation taken from the right of Figure 1, the lower half of Figure 2 being a sectional view in the radial plane indicated by the line 2—2 of Figure 1, and Figure 3 is a further sectional view taken in the radial plane indicated by the line 3—3 of Figure 1.

Figure 4 is a side view of another modification of our novel rotor, the left half thereof being a view in elevation, the upper right quarter being a sectional view taken in the plane indicated by the line 4—4 of Figure 5, and the lower right quarter being a sectional view taken in the plane indicated by the line 4A—4A of Figure 5. Figure 5 is an edge view taken from the right as seen in Figure 4, the lower half thereof being a view in elevation and the upper half thereof being a sectional view taken in the plane indicated by the line 5—5 of Figure 4, and Figure 6 is a sectional view taken in the plane indicated by the line 6—6 of Figure 4.

Figure 7 is a side view of another modification of our invention, and Figure 8 is an edge view taken from the right as seen in Figure 7, the upper half thereof being a view in elevation and the lower half thereof being a sectional view taken in the plane indicated by the line 8—8 of Figure 7.

Figure 9 is a fragmentary side view of still another modification of our invention, only the upper half of the rotor being shown inasmuch as said rotor is symmetrical in design as in the previous modifications. Figure 10 is a sectional view taken in the radial plane indicated by the line 10—10 of Figure 9 and Figure 11 is a further sectional view taken in the radial plane indicated by the line 11—11 of Figure 9. Figure 12 is a fragmentary edge elevation taken from the top as seen in Figure 9.

Describing our invention in detail and referring first to the modification shown in Figures 1 to 3 inclusive, the rotor comprises a pair of spaced annular backing plates 2, 2, each of said plates being flanged at 4 about the outer perimeter thereof. The spaced radially arranged blades 6, 6 extend between the backing plates 2, 2 and each blade 6 comprises the oppositely directed flanges 8, 8 at opposite edges thereof in order to facilitate welding of said blade to the backing plates 4, 4 as hereinafter more fully described. Each backing plate 2 comprises a plurality of round openings 10, 10 therethrough for the reception of complementary lugs 12, 12 on the brake ring 16 cast thereon as hereinafter more fully described. The braking rings 16, 16 present outwardly directed annular friction surfaces at opposite sides of the rotor, and said surfaces are formed and arranged for engagement with stationary brake shoes or other nonrotating friction members, whereby the rotor and the rotating member to which it is attached may be conveniently decelerated as will be clearly apparent to those skilled in the art.

The brake rings 16, 16 are integral with the disc-like support or hub member 20 cast on the backing plates as hereinafter more fully described, and integral radial ribs 22, 22 are formed on the hub 20 and extend between the brake rings 16, 16 through the associated openings 10, 10 in the backing plates, as best seen in the lower half of Figure 2, and at opposite sides of each rib 22 are formed webs 24, 24 merging at right angles with the rib 22, said webs 24, 24 being integral with the hub 20 as will be best understood from a consideration of Figures 1 and 3. The hub 20 is formed with an annular flange 26 at the inner perimeter thereof and with a series of spaced bosses 28, 28 adjacent said perimeter, said bosses having respective openings 30, 30 therethrough. To those skilled in the art it will be clearly apparent that the flange 26 will be received within a complementary bore on an associated rotating member, said hub portion being seated at 32 (Figures 2 and 3) against said member and being secured thereto by any convenient means such as bolts or rivets extending through the openings 30, 30 and through aligned openings on the associated rotating member, the openings 30, 30 in the rotor being reinforced by the bosses 28, 28 as will be clearly apparent.

In the modification shown in Figures 1 to 3 the fabricated rotor disclosed is formed by spot welding the flanges 8, 8 of the blades 6, 6 to the backing plates 2, 2. The backing plates and the blades welded thereto are then inserted into a mold and the brake rings 16, 16 and the hub 20 are cast thereon, the openings 10, 10 in the backing plates permitting the cast iron to flow into said openings, thus forming the lugs 12, 12 on the brake rings 16, 16, said lugs serving to make secure the connection between the rings 16, 16 and the backing plates 2, 2 as will be clearly apparent to those skilled in the art.

Another modification of our invention is shown in Figures 4 to 6 inclusive. In this modification a pair of spaced annular members 52, 52, formed of metal mesh, are welded to the spaced radially arranged steel blades 54, 54, said backing members 52, 52 affording a support for the iron brake rings 56, 56 cast on the outer sides thereof, said rings being integral with the disc-like support or hub member 58 comprising the spaced radially arranged ribs 60, 60 extending between the backing members 52, 52 and integral with the brake rings 56, 56. At opposite sides of each rib 60 are the webs 62, 62 merging at right angles therewith, said webs being integral with the support or hub member 58. It will be noted from a comparison of Figures 4 and 6 that the steel blades 54, 54 at opposite sides of each radial rib 60 are relieved as at 64, 64 respectively in order to accommodate the reinforcing webs 62, 62 associated with the rib 60.

The support or hub member 58 comprises the annular flange 66 at the inner perimeter thereof and said hub member also comprises the spaced bosses 68, 68 therearound, each of said bosses comprising an opening 70 therethrough. It will be readily apparent that, as in the previous modification, the flange 66 will be received within a complementary bore on an associated wheel or other rotating member. The hub portion will seat as at 72 against said rotating member, the rotor being secured to said member by any convenient means extending through the openings 70, 70 and secured to the associated member.

In the modification shown in Figures 4 to 6 the fabricated rotor disclosed is manufactured by spot welding the radial steel blades 54, 54 to the mesh backing members 52, 52, said blades and said mesh members being then inserted in a mold and the brake rings 56, 56 as well as the hub or support member 58 being cast thereon as will be clearly apparent.

Still another modification of our invention is disclosed in Figures 7 and 8 wherein the spaced annular backing plates 102, 102 are welded to the substantially V-shaped radially arranged blades 104, 104 at opposite sides of the rotor. Extending between the blades 104, 104 at each side of the rotor is a bell-shaped support or hub member 106 welded as at 108, 108 to said blades. The backing plates 102, 102 are flanged as at 110, 110 respectively for the accommodation of the iron brake rings 112, 112 cast on the respective backing plates, said brake rings extending through openings 114, 114 on the respective plates as in the modification shown in Figures 1 to 3 inclusive.

The inner perimeter of the hub member 106 comprises the annular flange 116, said flange being receivable within a complementary bore on an associated rotating member as described for the corresponding flanges disclosed in the previous modifications. On the inner surface of the hub member 106 and adjacent the inner perimeter thereof an annular ring 118 is welded as at 120, 120 (Figure 8), said ring and said hub member comprising the aligned openings 122, 122 therethrough. It will be apparent that the rotor shown in Figures 7 and 8 may be secured to an associated rotating member through the openings 122, 122 substantially as described for the previous modifications, the annular ring 118 serving as reinforcing means as will be clearly apparent.

In the modification shown in Figures 7 and 8, the center member formed of a pressed steel plate is spot welded at 108, 108 to the V-shaped blades 104, 104, said blades then being spot welded at 124, 124 to the respective annular backing plates 102, 102. The structure thus formed is then placed in a mold and the annular iron brake rings 112, 112 are cast to the respective backing plates 102, 102 as described for the previous modifications, the cast iron comprising the rings 112, 112 extending through the openings 114, 114 in the respective backing plates in order to afford efficient securement thereto. The annular ring 118 may be welded to the support or hub member 106 either before or after the casting of the brake rings 112, 112 as desired.

A fourth modification of our invention is disclosed in Figures 9 to 12 inclusive, and in this modification the spaced annular backing plates 152 and 153 are welded at 154, 154 through round openings therein to the radial steel blades 156, 156, the backing plate 153 comprising the annular flange 158 at the inner perimeter thereof, said flange being formed and arranged for reception within a complementary bore on an associated rotating member as will be understood. The backing plate 153 comprises the openings 160, 160 adjacent its inner perimeter, and welded to said plate are the spaced annular rings 162, 162 comprising the openings 164, 164 therethrough, the openings 164 being aligned with the openings 160 on the backing plate 153 in order to afford passage for associated securing means, said means serving to secure the rotor to the associated rotating member as in the modifications previously described.

The blades 156, 156 are each welded at 166 to the adjacent annular ring 162 as best seen in Figure 10 and between each blade 156 and the adjacent blade 156 are a pair of radial steel blades 168, 168, said blades being reversely flanged at opposite edges thereof as at 170, 170 in order to facilitate the welding of said blades to the backing plates 152 and 153, said blades being spot welded to said plates as in the case of the corresponding blades disclosed in the previous modifications.

Each backing plate 152 and 153 comprises an annular flange 172 on the outer perimeter thereof and the spaced circular openings 174, 174 extending therethrough. Cast on the outer surface of each of the backing plates 152 and 153 is an iron brake ring 176, said brake ring extending through the openings 174, 174 in the associated backing plate and abutting the flange 172 thereon as will be clearly apparent from a consideration of Figures 9 and 11.

It will be readily apparent that the modification shown in Figures 9 to 12 inclusive differs from the previous modifications in that one of the backing plates 153 is formed and arranged as a support or hub member and comprises the means for securing the rotor to an associated rotating member, whereas in the previous modifications the hub member was connected to the rotor between the backing plates, whereby a double blower rotor was formed which, during operation thereof, was adapted to draw air between the backing members from opposite sides of the support member.

In the modification disclosed in Figures 9 to 12 inclusive, the blades 156, 156 and 168, 168 are welded between the backing plates 152 and 153, and the structure thus formed is placed in a mold and the iron brake rings 176, 176 are cast on the outer surfaces of the backing plates 152, and 153, said brake rings extending through the openings 174, 174 in the respective backing plates substantially as in the previous modifications. The annular rings 162, 162 may be welded to the backing plate 153 and to the blades 156, 156 either before or after the casting operation but preferably before said operation in order to form a rigid structure upon which to cast the iron brake rings.

Thus it will be seen that in each of the modifications disclosed, we have designed a fabricated rotor in which radial steel blades are welded between spaced annular backing members, said backing members affording support for iron brake rings cast thereon, in certain of the modifications the brake rings being integral with a disc-like hub member extending between the backing plates, in another modification the steel blades being welded to a disc-like backing plate interposed between the blades, and in still another modification one of the backing plates being formed and arranged as a hub member, whereby air is drawn between the backing plates from one side of the hub member only.

It is to be understood that we do not wish to be limited by the exact embodiments of the device shown which are merely by way of illustration and not limitation as various and other forms of the device will, of course, be apparent to those skilled in the art without departing from the spirit of the invention or the scope of the claims.

We claim:

1. The method of fabricating a rotor comprising the steps of welding a plurality of spaced radial blades at opposite edges thereof to a pair of spaced perforated annular backing members, and then casting brake rings on the remote surfaces of said members and simultaneously casting a support hub with radial ribs extending between said members and into certain of the perforations therethrough.

2. In a rotor, spaced annular friction members, radial blades extending therebetween, and a hub having radial ribs extending between said members and connected thereto, said hub comprising spaced webs extending between said members at opposite sides of each rib and joining the same at substantially right angles thereto.

3. In a rotor, spaced annular friction members, radial blades extending therebetween, and a hub having radial ribs extending between said members and connected thereto, said hub comprising spaced webs extending between said members at opposite sides of each rib and joining the same at substantially right angles thereto, each of said webs extending through a radial slot in the adjacent blade.

4. In a fabricated brake rotor, spaced backing members, brake rings cast on the remote surfaces thereof, a support hub having portions extending between said members and cast thereon, and blades extending between and welded at opposite edges thereof to said members.

5. In a fabricated brake rotor, spaced backing members, brake rings cast on the remote surfaces thereof, a support hub having portions extending between said members and cast thereon, and blades extending between and welded at opposite edges thereof to said members, said backing members being formed with annular flanges on their outer perimeters confining said rings.

6. In a fabricated brake rotor, spaced annular perforated backing members, metallic brake rings cast on the remote surfaces of said members, and a hub member comprising radial ribs extending between said backing members, said ribs being cast through the perforations in said members and merging with said rings.

7. In a fabricated brake rotor, spaced annular perforated backing members, metallic brake rings cast on the remote surfaces of said members, a hub member comprising radial ribs extending between said backing members, said ribs being cast through the perforations in said members and merging with said rings, and a plurality of webs on said hub member merging with opposite sides of each rib at substantially right angles thereto.

8. In a fabricated brake rotor, spaced annular backing members, a plurality of spaced radial blades welded between said members, metallic brake rings cast on the remote surfaces of said members, and a hub member comprising radial ribs extending between said backing members and cast thereon.

9. In a fabricated brake rotor, spaced annular backing members, a plurality of spaced radial blades welded between said members, metallic brake rings cast on the remote surfaces of said members, and a hub member comprising radial ribs extending between said backing members and cast thereon, said hub member comprising a plurality of webs merging at opposite sides of each rib at substantially right angles thereto.

10. The method of fabricating a rotor comprising the steps of inserting into a mold a structure consisting of spaced annular perforated backing members and substantially radial blades connected therebetween, and then casting on said structure brake rings abutting the remote sides of said members and simultaneously casting a support hub with substantially radial ribs extending between said members and merging with said rings through said perforations.

11. In a fabricated brake rotor, spaced backing members, a plurality of blades connected therebetween, metallic brake members cast on the remote sides of said backing members, and a hub member with spaced portions extending between said backing members and cast through openings therein to merge with said brake members, at least one of said backing members and its associated brake member being provided with fluid inlet means communicating with the space between said backing members.

12. In a fabricated brake rotor, spaced backing members each being formed of metallic mesh, a plurality of blades connected therebetween, metallic brake members cast on the remote surfaces of said backing members, and a hub with spaced ribs extending between said backing members and cast therethrough to merge with said brake members, at least one of said backing members and its associated brake member being provided with a fluid inlet communicating with the space between said backing members.

13. A fabricated brake rotor comprising spaced perforated backing plates, a hub member having spaced portions extending therebetween and cast through the perforations in said plates to merge with brake rings cast on the remote sides thereof, blades connected between said plates, and annular flanges on the outer perimeters of said plates confining the associated rings.

14. In a fabricated brake rotor, spaced annular backing members, a plurality of spaced radial blades welded between said members, metallic brake rings cast on the remote surfaces of said members, and a hub member comprising radial ribs extending between said backing members and cast thereon, said hub member comprising a plurality of webs merging at opposite sides of each rib at substantially right angles thereto, each of said webs extending through a radial slot in the adjacent blade.

15. A fabricated rotor comprising spaced backing members with openings therethrough, blades welded between said members, and a structure cast on said members comprising brake rings on the remote sides of said members and a support member including spaced portions merging with said rings through said openings.

16. A method of fabricating a rotor comprising the steps of inserting into a mold a structure comprising spaced perforated backing members, at least one of which is provided with a central opening, and substantially radial blades connected between said members, and then casting on said structure brake rings abutting the remote sides of said members and simultaneously casting a support hub extending through said opening with a plurality of spaced columns extending between said members and through certain of said perforations to merge with said rings.

17. A method of fabricating a rotor comprising the steps of inserting into a mold a structure comprising spaced backing members, at least one of which comprises a central opening therethrough, and substantially radial blades connected between said members, and then casting on said structure brake plates abutting the remote sides of said members and simultaneously casting a support hub extending through said openings with spaced portions extending between said members and into passages therethrough to merge with respective plates.

18. A method of fabricating a rotor comprising the steps of welding a plurality of radial blades at opposite edges thereof to a pair of spaced perforated backing members, at least one of which is provided with a central opening, and then casting friction elements on the remote surfaces of said members and simultaneously casting a support hub extending through said opening with a plurality of spaced columns extending between said members and through certain of the perforations therethrough.

19. A method of fabricating a brake rotor comprising the steps of welding a plurality of blades to a pair of spaced backing members, at least one of which comprises a central opening, and then casting friction plates on the remote sides of said members and simultaneously casting a support hub extending through said opening with spaced integral portions extending between said members and into passages therethrough to merge with respective plates.

WALTER H. BASELT.
CARL E. TACK.